United States Patent Office 3,248,204
Patented Apr. 26, 1966

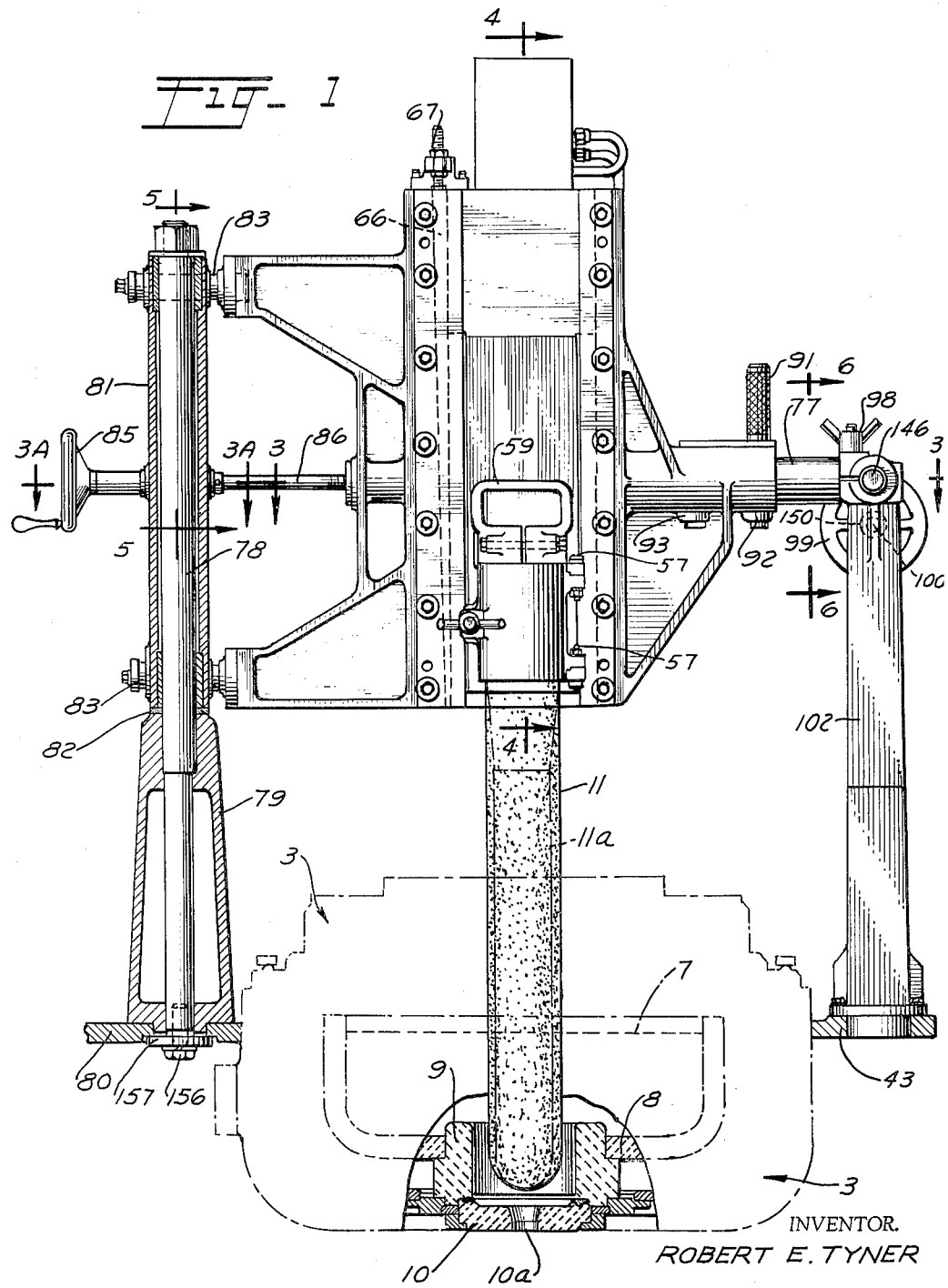

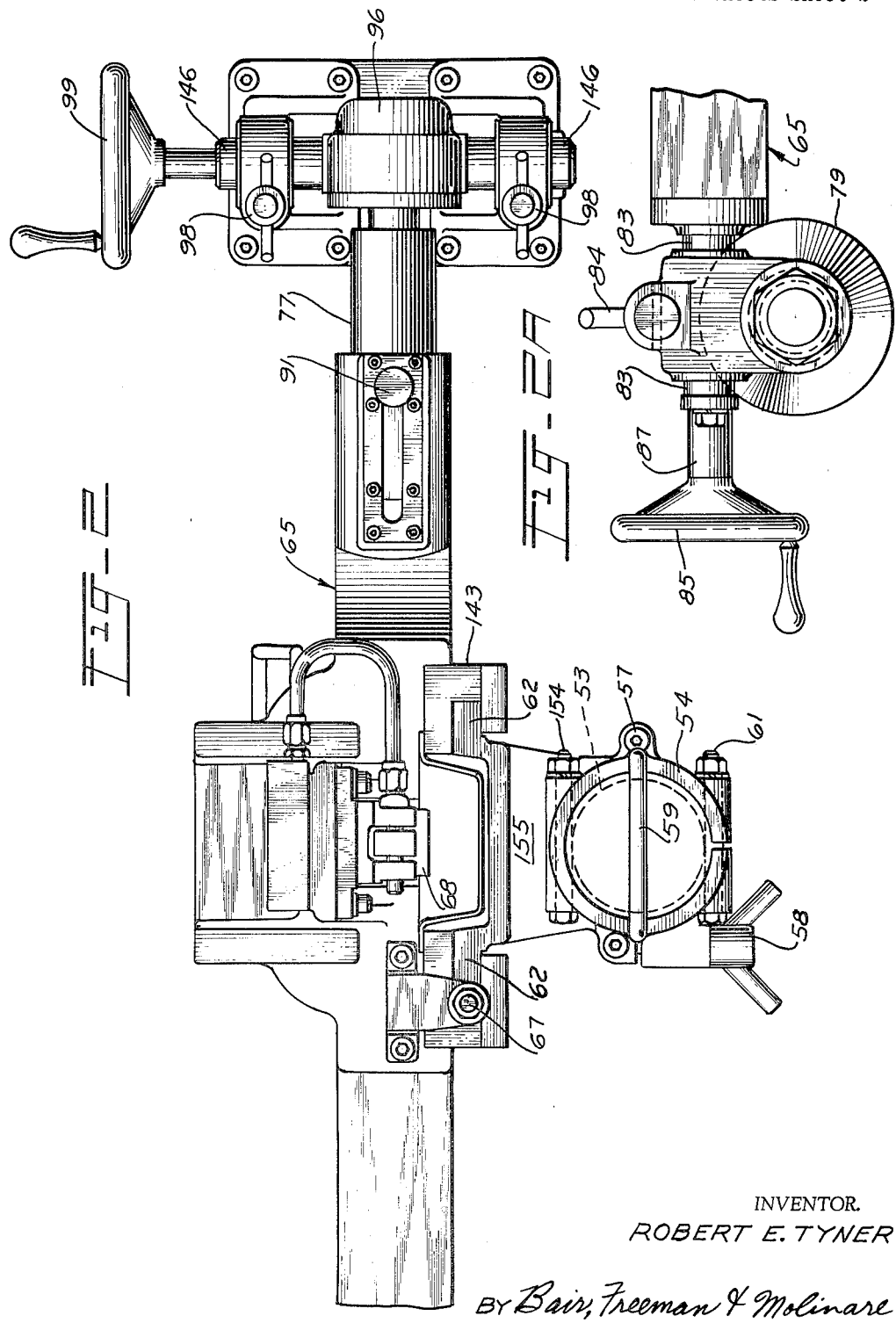

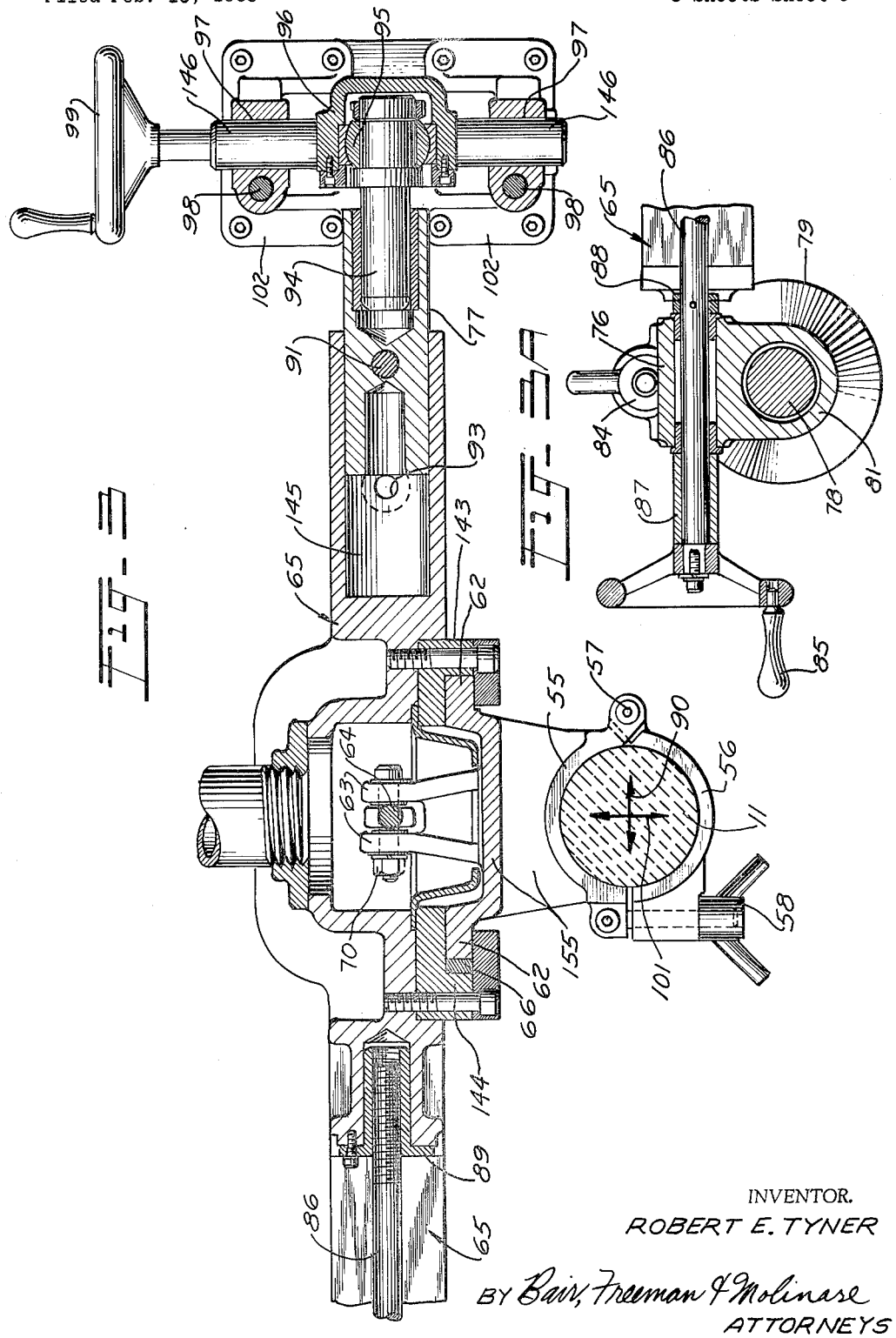

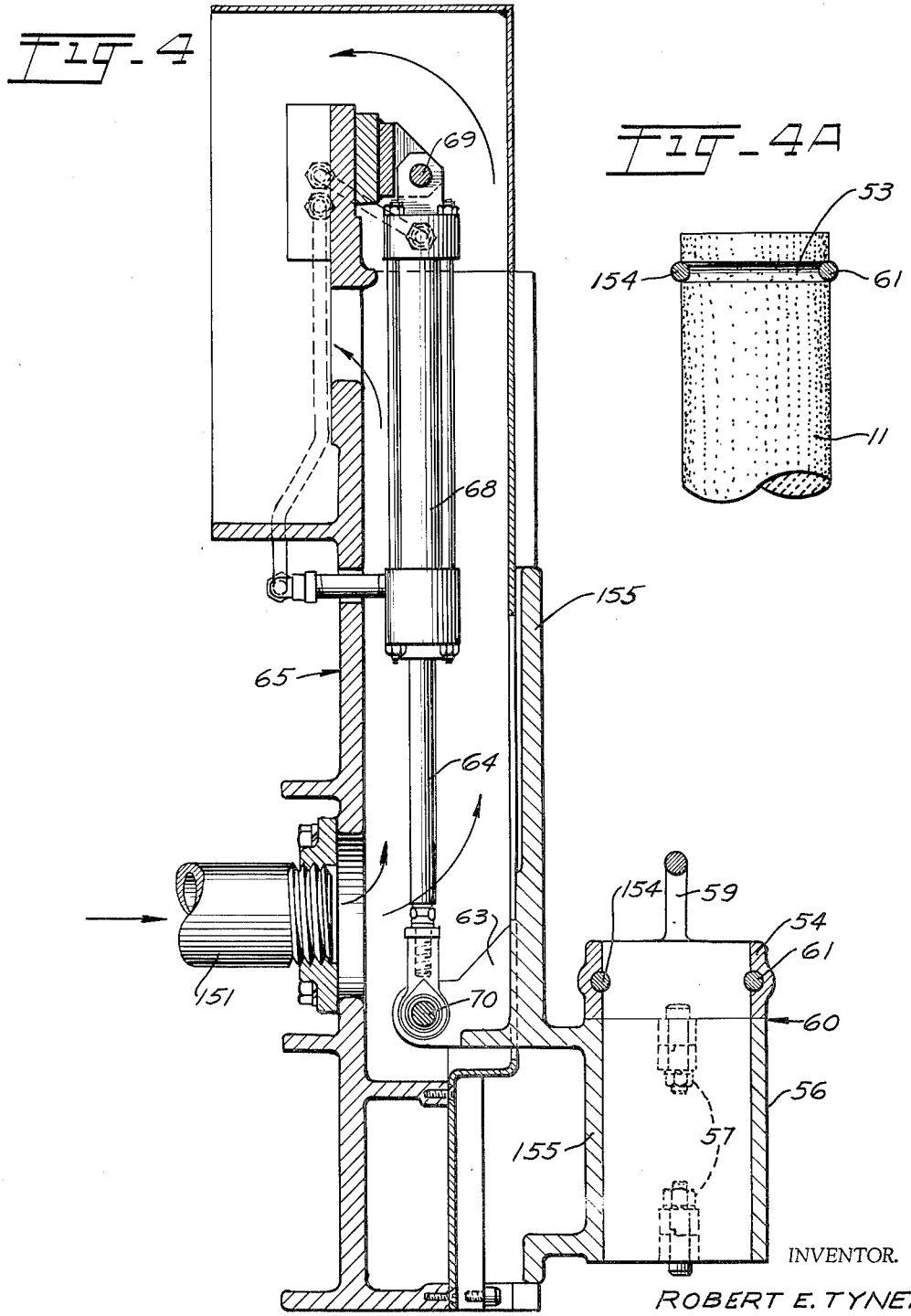

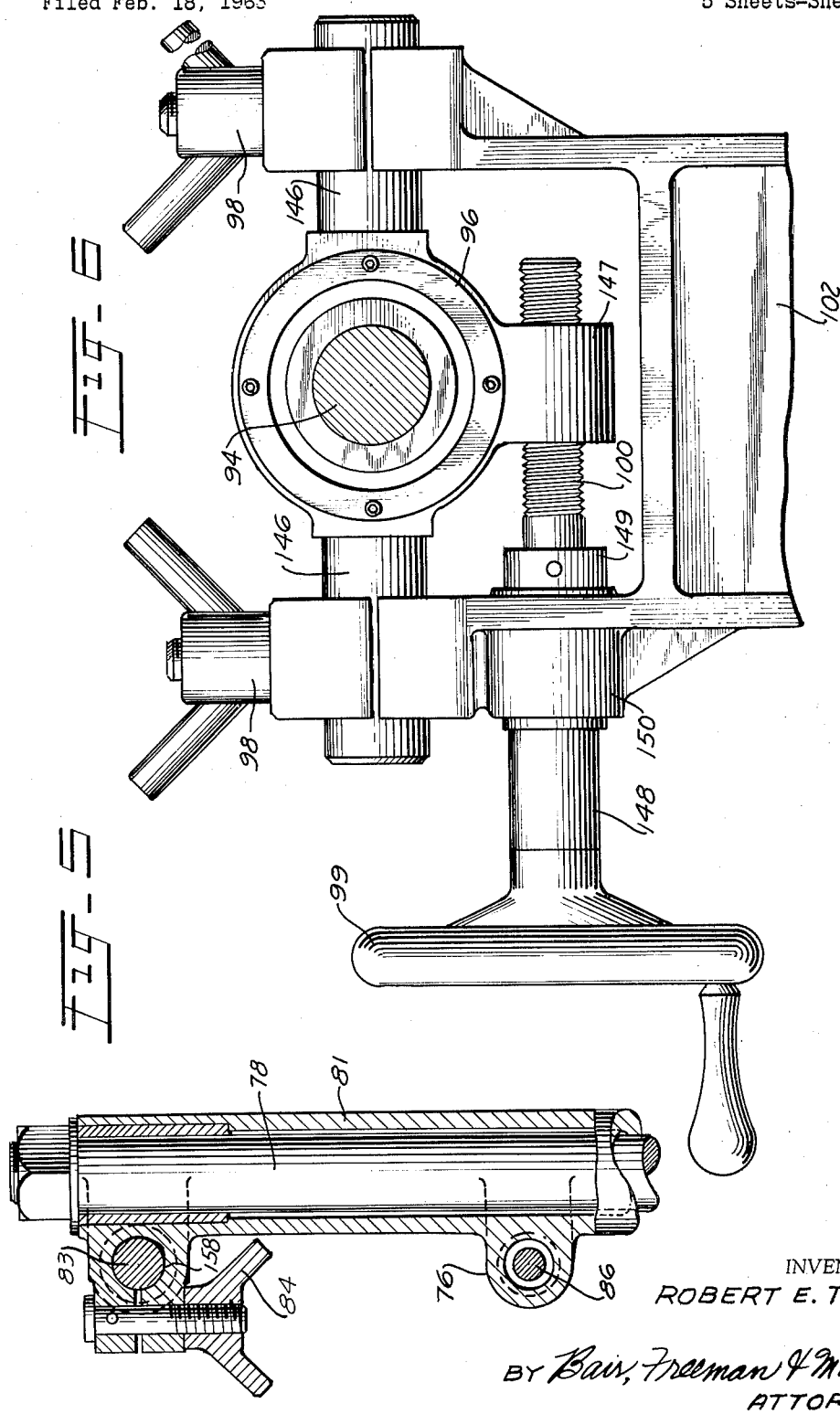

3,248,204
PLUNGER MECHANISM FOR GLASS GOB
FEEDER
Robert E. Tyner, Toledo, Ohio, assignor to Lynch Corporation, Anderson, Ind., a corporation of Indiana
Filed Feb. 18, 1963, Ser. No. 258,988
7 Claims. (Cl. 65—330)

This invention relates to a plunger mechanism for a glass gob feeder.

A glass gob feeder receives molten glass from a forehearth and by action of its components, forms the molten glass into gobs of suitable size, weight and shape for use by a glassware forming machine. In general, such a feeder is made up of four major components or sub-assemblies as follows:

(1) Plunger mechanism (the present invention being a disclosure thereof).
(2) Tube mechanism (disclosed in my copending application, Serial No. 243,236, filed December 10, 1962).
(3) Feeder bowl.
(4) Shear mechanism.

The purpose of the plunger assembly is to support a ceramic plunger with its lower extremity in the molten glass and directly in line with and above an orifice of an orifice bushing, and to reciprocate the plunger vertically in a prescribed manner. The motions of the plunger control gob weight and shape, and draw the glass above the gob off the shears after completion of the shearing operation.

One object of the invention is to provide a novel plunger clamping arrangement wherein the plunger is held adjacent its upper end by a two-piece clamp assembly while at the extreme top of the plunger a handle is clamped. This handle provides a means for the operator to manually handle the plunger to and from mounted position on the plunger supporting mechanism and to provide a means that prevents the plunger from dropping through the clamp assembly should it become loose at any time.

Another object is to provide a chunk of generous diameter for efficient holding of an upper end of the plunger of comparable diameter, and adaptable to receive plungers of different smaller sizes which are enlarged at their upper end to the chuck diameter, thus creating a plunger section of maximum strength and stiffness at the clamping point.

Still another object is to provide a plunger mounting means which is reciprocable vertically associated with means for guiding the same which restricts the movement of the lower end of the plunger and avoids any possibility of weave thereof.

A further object is to provide motive force for operating the plunger in the form of a hydraulic cylinder and piston assembly mounted parallel with the plunger motion and therefore avoiding any pivoting action and effecting maximum efficiency of operation.

Still a further object is to provide the entire unit consisting of guiding means and plunger operating components mounted on a main casting which extends across the top of the feeder bowl and is supported primarily from a post at one side thereof and secondarily through a pin connection at the other side that permits quick release for maintenance purposes.

An additional object is to provide means for adjusting the main casting in a horizontal plane and in two directions substantially at right angles to each other so that the lower end of the plunger can be properly adjusted with respect to the orifice bushing with which the plunger cooperates.

Another additional object is to provide one of the adjusting means operable to move the main casting toward or away from the primary post and the other adjusting means to move the pin connection laterally of the main frame, the second adjustment being supported by the secondary post.

With these and other objects in view, my invention consists in the construction, arrangement and combination of the various parts of my plunger mechanism, whereby the objects above contemplated are attained, as hereinafter more fully set forth, pointed out in my claims and illustrated in detail on the accompanying drawings, wherein:

FIG. 1 is a front elevation partly in section of my plunger mechanism;

FIG. 2 is an enlarged plan view thereof with the exception of the left hand end which is continued in FIG. 2A;

FIG. 3 is an enlarged horizontal sectional view on the line 3—3 of FIG. 1;

FIG. 3A is an enlarged horizontal sectional view on the line 3A—3A of FIG. 1, being a continuation of the left hand end of FIG. 3;

FIG. 4 is an enlarged vertical sectional view on the line 4—4 of FIG. 1 to show the hydraulic actuator for the vertical reciprocating motion of the plunger;

FIG. 4A is an elevation of the upper end of the plunger showing how a pair of bolts of FIG. 4 cooperate with a groove thereof;

FIG. 5 is an enlarged vertical sectional view on the line 5—5 of FIG. 1, and

FIG. 6 is an enlarged vertical sectional view on the line 6—6 of FIG. 1.

On the accompanying drawings I have used the reference numeral 11 to indicate the plunger itself which projects into a feeder bowl 8 shown in FIG. 1 through a sleeve-like spout 9 to a position adjacent an orifice bushing 10, the orifice of which is indicated at 10a. The plunger 11 is shown in its proper position relative to the "metal line" or surface 7 of the molten glass in the bowl 8. The plunger 11 is held at its upper end by a two-piece clamp assembly comprising a clamp seat 55 (see FIG. 3) and a clamp shell 56. The shell 56 is hinged at 57 to the clamp seat 55 thereby permitting it to swing clear of the plunger and allowing easy removal and replacement of a plunger. A clamping nut 58 is provided to lock the clamp shell 56 against the plunger and hold it rigidly seated in the clamp seat 55.

At the extreme top of the plunger and clamped thereto is a handle 59 (see FIGS. 1, 4 and 4A). This handle provides a means for the operator to manually transfer the plunger to and from the plunger mounting mechanism and it provides surface contact with the upper end of the clamp 55–56 along the line 60 as shown in FIG. 4. The handle 59 has a split ring-like portion 54 (see FIG. 2) and a bolt 61 to contract the ring 54 into tight engagement with the surface of the plunger 11. The ring 54 also has a second bolt 154, and the two bolts 61 and 154 as shown in FIGS. 4 and 4A are adapted to enter an annular groove 53 of the plunger 11. The bolts extend through opposite sides of the groove, the bottom of which is shown dotted at 53 in FIG. 2 for purposes of illustration.

The line of contact at 60 assures vertical location of the plunger 11 and provides the means for preventing the plunger from dropping through the clamp 55–56 should the clamp become loose at any time. If the plunger should become loose in either of the clamps 55–56 or 54, it is still retained from falling into the feeder bowl by the interference of the bolts 61 and 154 in the groove 53. Thus I eliminate the possibility of a loose plunger dropping into the feeder bowl and causing damage primarily to the orifice bushing 10, and which can also damage the spout 9 or other parts within the feeder bowl. In present day equipment plungers sometimes break at or just below the point at which they are chucked, this being the weakest section of the plunger and therefore most prone to breakage because the chuck which clamps the plunger is standardized at a diameter which is usually smaller than the plunger diameter. In my design I have standardized on a chuck diameter which is the largest anticipated plunger diameter of 5″. It is therefore seen, that for a 5″ plunger diameter the entire plunger is of a constant cylindrical shape and with any smaller plunger such as illustrated at 11a in FIG. 1 a tapered section exists between the 5″ chuck diameter and the smaller plunger diameter. This creates a section at the upper end of the plunger which is of maximum strength and stiffness at the clamping point and results in considerably reducing the instances of plunger failure due to breakage.

The plunger clamp seat 55 has a base 155 terminating in vertical flanges 62 as shown in FIG. 3, which are confined in vertical ways 143 and 144 so designed as to permit vertical motion only of the plunger. All other motions are prohibited and therefore the plunger movement is restricted to reciprocation directly up and down above the orifice 10a. The ways 143 and 144 are bolted rigidly to a main casting 65 that serves as a support for the plunger. The ways 143 and 144 are fitted to the flanges 62 with a minimum of clearance to avoid any possible wobble, and in order to maintain the proper clearance endwise between the ways and to take up lateral play, a tapered gib 66 is provided (shown dotted in FIG. 1) which may be adjusted vertically. Such vertical adjustment of the gib may be accomplished by means of a screw 67.

The motive force for operating the plunger 11 is a hydraulic cylinder 68 (see FIG. 4) which is pivotally mounted on its head end at 69 and has the usual piston therein from which a piston rod 64 extends. The lower end of the piston rod 64 is pivoted at 70 to a pair of ears 63 extending from the clamp seat base 155 and its flanges 62 (see FIG. 3). The cylinder 68 is mounted parallel with the plunger motion and therefore there will be substantially no pivoting action at either point 69 or 70. However these pivots are provided to compensate for any misalignment condition and to make the hydraulic unit more easily replaceable. The pivot at 70 includes a spherical joint to permit compensation for misalignment in any direction. At 151 a blow air connection is provided for cooling air into the casting 65 around the hydraulic unit 64–68.

The main casting 65 extends completely across the top of the feeder indicated generally at 3 in FIG. 1. It is supported primarily from a supporting shaft 78 extending upwardly from a column 79 shown at the left side in FIG. 1, and secondarily through a pin connection 77 at the right side. The pin connection is intended to lock the plunger assembly in position during normal periods of operation but allows a quick release for maintenance purposes as will hereinafter appear. This release mechanism permits the entire plunger assembly to be rotated about the supporting shaft 78 to a position where it clears the feeder 3 for maintenance.

The supporting shaft 78 is pulled in tension against the column 79 by a screw 156 and a washer 157, and the shaft and column are thus attached rigidly to and receive their support from a structural element 80 of the feeder 3. Extending upwardly from the column 79 is a sleeve 81 which is separated from the column by a thrust-washer 82 and is bushed at either end about the shaft 78. The sleeve 81 is bored at 158 to receive a pair of horizontal pins 83 (see FIGS. 1 and 2A), the upper one of which is shown in FIG. 5. These pins extend rigidly from the main casting 65 and slide in the bored holes 158 of the sleeve 81 and may be clamped at any position by means of a pinch clamp 84 for each pin, which clamps are built into the sleeve.

The means for adjusting the plunger mechanism in the direction longitudinally of these pins is a hand wheel 85 and a threaded rod 86 shown in FIGS. 2A and 3A. Its threads are shown in FIG. 3. The hand wheel is held in position by means of a sleeve 87 and a collar 88 shown in FIG. 3A, the latter of which is pinned to the threaded shaft 86. Thus the hand wheel and shaft are free to rotate but not to move axially in a bearing projection 76 of the sleeve 81 as shown in FIG. 5. FIG. 3 also shows the threaded end of the rod 86 threaded into a bushing 89 affixed to the main casting 65. Therefore as the hand wheel 85 is rotated the threaded engagement between 86 and 89 causes the main casting 65 and components supported thereby to be adjusted in the direction 90 shown on the plunger 11 in FIG. 3.

The right hand end of FIG. 3 also shows the connecting pin 77 housed in a bore 145 of the casting 65 which permits the pin to slide horizontally back and forth. This movement of the pin is accomplished manually through a handle 91 in the form of a pin that may be positioned at either an outer position or an inner position, there positions corresponding respectively to perforated bosses 92 and 93 shown in FIG. 1 and adapted to selectively receive the lower end of the handle 91 which rests therein by gravity. The handle is axially moved within the pin 77 to engage either of the perforations of the bosses 92 or 93, thus locking the pin 77 at either of the extreme positions.

The outer end of the pin 77 is bored and bushed to mate with a pin 94 (see FIG. 3) which is supported by a spherical bushing 95. This spherical bushing is held rigidly in a housing 96 which has pins 146 extending from it that are slidable in bored openings 97 of a post-like supporting casting 102. These bored openings permit adjustment of the bearing housing 96 in the direction of the pins 146, and these pins may be clamped in any particular position by means of pinch clamps 98. The means of adjusting the bearing housing 96 is best shown in FIG. 6. A hand wheel 99 is rigidly connected to a rotatable threaded rod 100 which in turn engages a tapped hole in a lug 147 depending from the bearing housing 96. The hand wheel and threaded rod are restrained from axial movement by means of a sleeve 148 and a collar 149 with respect to a bearing 150 in which the threaded rod 100 is rotatable, and therefore rotation of the hand wheel moves the bearing housing 96 in the direction determined by the direction of sliding of the pins 146 extending from the housing.

By utilizing the adjustment just described the entire plunger assembly is moved in a small arc about the shaft 78. This movement provides for adjustment of the plunger in the direction of the arrow 101 shown on the plunger 11 in FIG. 3. Such adjustment, though actually an arc about the shaft 78, is very nearly a straight line due to the large radius and relative position of the plunger and shaft. Due to the adjustments indicated by the arrows 90 and 101, the plunger 11 may be adjusted to any position within approximately ½″ radius from a central position thus permitting its alignment with the orifice 10a under any operating conditions. The casting 102 in turn is bolted to the top of a casting 43 forming part of the feeder framework and is stationary with respect to the structural element 80 of the feeder 3 and accordingly stationary with respect to the feeder.

During glassware forming operations it is often necessary to change plungers. When a change in gob shape is desired, variations in both plunger diameter and the shape of its point are necessary in order to produce the various gob weights and shapes required. In general a plunger with a hemispherical point as shown in FIG. 1 is used to produce short, blunt gobs whereas a plunger with a tapered point is used to produce a longer more pointed gob. The diameter of the plunger will be varied primarily in accordance with gob weight desired and orifice diameter. A maximum plunger diameter may, for instance, be 5″ and used with a 7″ spout 9. However under conditions of extremely heavy pull on the glass feeder it may be necessary to use a somewhat larger diameter plunger with a 9″ spout. The plunger must be preheated before being placed in operation.

In order to perform the functions of weight and shape control, it is necessary to control both the height and stroke of the plunger. These are both controlled by the hydraulic cylinder 68 which produces the plunger movement. Electronic control components for this purpose may be provided but form no part of my present invention and accordingly are not illustrated.

A plunger mechanism as herein disclosed, has greater flexibility and is more efficient for frequent job changes. It is thereby more universal to cover a more complete range of feeding requirements. It provides more uniform gob weights, gob temperatures and gob shapes particularly at high speeds. Bottle manufacturers are continually requiring more accurate control of gob weight, temperature and shape in order to produce lighter weight bottles with thinner but more uniform wall weights. A plunger mechanism as herein disclosed, contributes to that end.

The plunger mechanism disclosed has a number of design improvements with respect to the prior art. In present day feeder equipment the plunger is usually supported by an arm which is cantilevered from the side of the feeder and operated by a cam and follower mechanism. This has resulted in an unstable plunger due to overhang and insufficient guide bearing, and has necessitated high inertia of the moving parts causing dynamic cam loading and cam follower problems at high operating speeds. By constructing my plunger mechanism overhead of the feeder bowl and supported from both sides thereof, I have minimized the inertia of the moving parts. By operating them hydraulically, I have a very desirable force-load relationship yielding positive control of the plunger at all times irrespective of operating speed. This promotes consistent and accurate control of gob weight and shape. Generous guides have been provided to give stability to the lower end of the plunger under all conditions, thus maintaining consistent gob shape. The plunger mounting clamp is more rigid than prior art types and of such size as to permit a stronger plunger which is an asset at higher speeds and for heavier gob weight conditions. The plunger clamp includes provisions prohibiting the plunger from becoming loose and dropping downward onto the orifice, spout, etc. By the use of a hydraulic actuator, the velocity pattern during the stroke of the plunger is more consistent at all operating speeds yielding more consistent and accurate control of gob shape. The entire plunger mechanism has been designed in such a way that it can be swung completely away from the top of the bowl thus providing convenient maintenance conditions for both the plunger mechanism and the bowl and other parts of the feeder below the plunger mechanism.

Some changes may be made in the construction and arrangement of the parts of my plunger mechanism without departing from the real spirit and purpose of my invention, and it is my intention to cover by my claims any modified forms of structure or use of mechanical equivalents which may reasonably be included within their scope.

I claim as my invention:

1. In a plunger mechanism for a glass gob feeder, a vertical primary post at one side of a feeder bowl, a vertical secondary post at the opposite side thereof, a plunger supporting frame having a pair of vertically spaced, horizontally sliding connections to said primary post and a single horizontally sliding connection to said secondary post, means for adjusting said supporting frame toward or away from said primary post, means for adjusting said single sliding connection relative to said secondary post in a horizontal direction laterally of said supporting frame, and means for clamping a glass gob plunger with respect to said supporting frame for supporting the plunger with respect to the orifice plate and orifice of the feeder bowl.

2. A plunger mechanism in accordance with claim 1 wherein said first means comprises a screw-threaded shaft connection between said plunger supporting frame and said primary post, a hand wheel at said primary post for rotating said screw-threaded shaft, said second means comprises a cross shaft slidably mounted on said secondary post and hand wheel and threaded shaft means for sliding the said cross shaft, said single sliding connection being pivoted to said cross shaft.

3. A plunger mechanism in accordance with claim 1 wherein said pair of sliding connections are rotatable with respect to said primary post and said single sliding connection comprises a telescoping sleeve and pin mechanism which is telescoped in said supporting frame for movement to a position of disassociation between said sleeve and said pin to permit said supporting frame to swing about said primary post as a pivot to a position from over said feeder bowl.

4. A plunger mechanism in accordance with claim 1 wherein said means for supporting the plunger comprises a supporting clamp encircling the plunger, said supporting clamp having an elongated base which is vertically slidable relative to said supporting frame, and hydraulically actuated cylinder, piston and piston rod means for ceciprocating said clamp relative to said supporting frame wherein said cylinder and piston rod are aligned with the direction of reciprocation and pivotally connected between said supporting frame and said clamp.

5. A plunger mechanism in accordance with claim 4 wherein a handle is clamped to the plunger above said clamp and rests on the upper surface thereof, said handle having a clamp bolt, a portion of which passes through a groove of the plunger to prevent downward movement of the plunger in case said clamp and/or said handle is loose.

6. A plunger mechanism for a glass gob feeder comprising a vertical primary post at one side of a feeder bowl, a vertical secondary post at the opposite side thereof, a plunger supporting frame having a pair of horizontally sliding connections, a first one to said primary post and a second one to said secondary post whereby it may slide in the approximate plane of the posts, means for adjusting said supporting frame toward or away from said primary post, means for adjusting said second sliding connection relative to said secondary post in a direction horizontally and laterally of said supporting frame, and means for clamping a glass gob plunger to said supporting frame for supporting the plunger with respect to the orifice plate and orifice of the feeder bowl, said first means comprising a screw-threaded shaft connection between said plunger supporting frame and said primary post and a hand wheel at said post for rotating the same, said second means comprising a cross shaft slidably mounted on said secondary post, and hand wheel and threaded shaft means for sliding the same, said second sliding connection being pivoted to said cross shaft.

7. In a plunger mechanism for a glass gob feeder, a pair of supporting means on opposite sides of a feeder bowl, a plunger supporting frame having a pair of horizontally sliding connections, one to each of said supporting means, means for adjusting said supporting frame toward or away from one of said supporting means, means for adjusting one of said sliding connections relative to the other of said supporting means in a direction laterally of said supporting frame, and means for clamping a plunger with respect to said supporting frame for supporting the plunger with respect to the orifice plate and orifice of the feeder bowl, said plunger supporting frame being pivotally mounted on said one of said supporting means, said sliding connection adjacent said other of said supporting means including a telescoping sleeve and pin mechanism which is telescoped in said supporting frame for movement to a position of disassociation between said sleeve and said pin to permit said supporting frame to swing about said one of said supporting means as a pivot to a position from over said feeder bowl.

References Cited by the Examiner
UNITED STATES PATENTS

| | | | |
|---|---|---|---|
| 1,651,036 | 11/1927 | Miller | 65—221 X |
| 2,073,573 | 3/1937 | Steimer | 65—223 |
| 2,100,760 | 11/1937 | Wadsworth | 65—127 X |
| 2,470,558 | 5/1949 | Honiss | 65—129 |

DONALL H. SYLVESTER, *Primary Examiner.*

A. D. KELLOGG, *Asistant Examiner.*